(No Model.)  3 Sheets—Sheet 1.
J. WITZELL.
LAMP LIGHTER.
No. 447,393.  Patented Mar. 3, 1891.
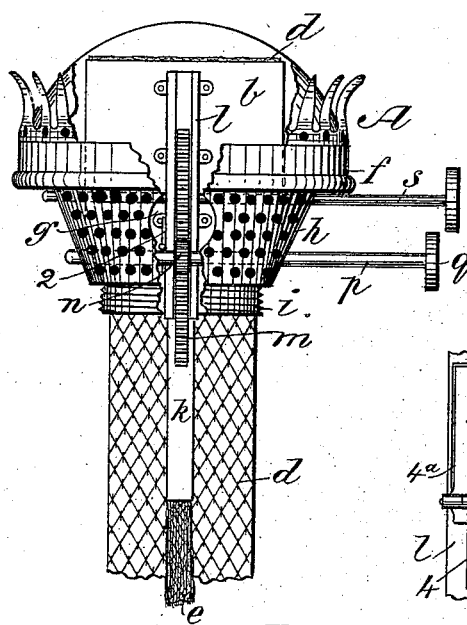
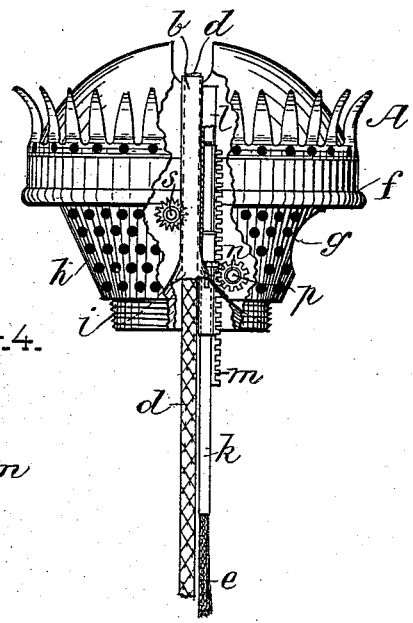
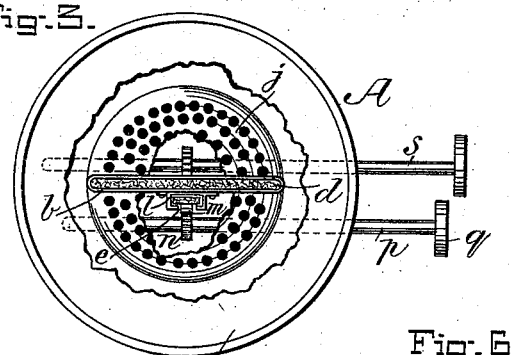
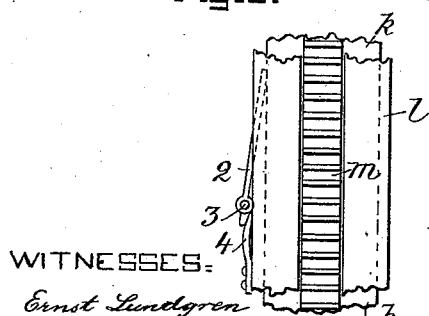
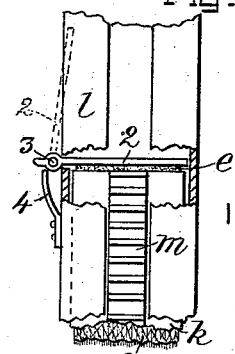
WITNESSES:
Ernst Lundgren
W. J. Morgan
INVENTOR:
Johan Witzell
By A. P. Theaper Atty
THE NORRIS PETERS CO., PHOTO-LITHO., WASHINGTON, D. C.

(No Model.) 3 Sheets—Sheet 2.
J. WITZELL.
LAMP LIGHTER.

No. 447,393. Patented Mar. 3, 1891.

WITNESSES:
Ernst Lundgren
H. J. Morgan

INVENTOR:
Johan Witzell,
By A. P. Thayer,
atty (No Model.) 3 Sheets—Sheet 3.
J. WITZELL.
LAMP LIGHTER.
No. 447,393. Patented Mar. 3, 1891.
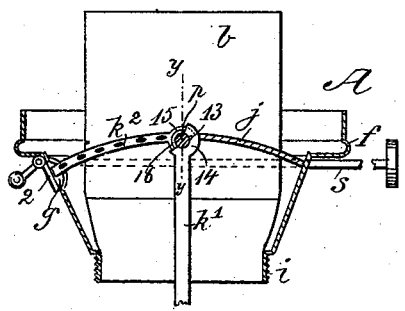
Fig. 10.
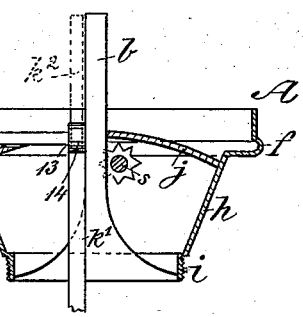
Fig. 11.
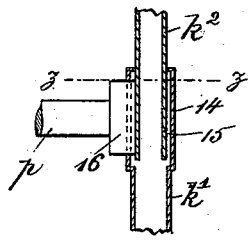
Fig. 14.
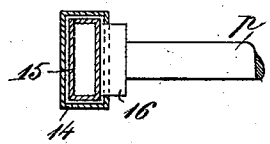
Fig. 15.
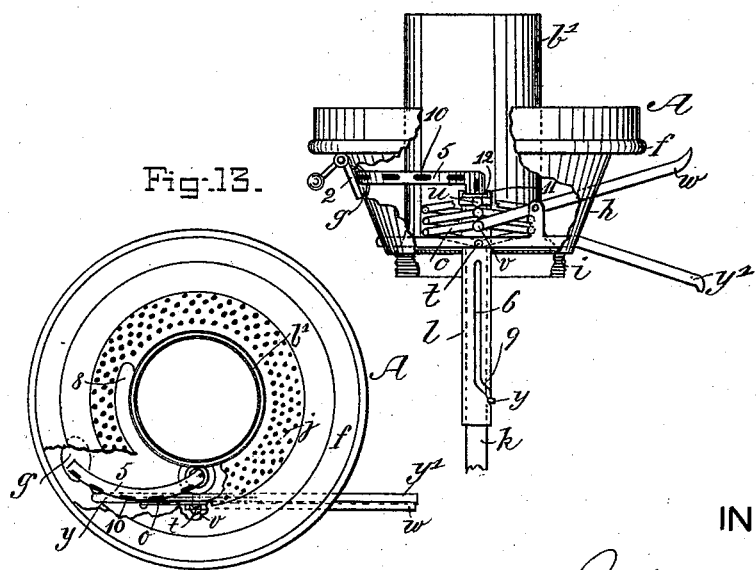
Fig. 12.
Fig. 13.
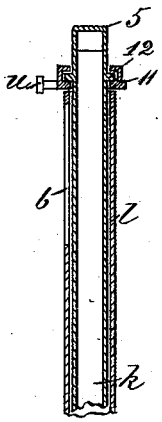
Fig. 16.
WITNESSES:
Ernst Lundgren
D. J. Morgan
INVENTOR:
Johan Witzell
By A. P. Thayer
Atty.
THE NORRIS PETERS CO., PHOTO-LITHO., WASHINGTON, D. C.

UNITED STATES PATENT OFFICE.

JOHAN WITZELL, OF NEW YORK, N. Y.

LAMP-LIGHTER.

SPECIFICATION forming part of Letters Patent No. 447,393, dated March 3, 1891.

Application filed May 6, 1890. Serial No. 350,824. (No model.)

*To all whom it may concern:*

Be it known that I, JOHAN WITZELL, a citizen of Sweden, and a resident of New York city, in the county and State of New York, have invented new and useful Improvements in Lamp-Lighters, of which the following is a specification.

The object of my invention is to provide simple and efficient means of lighting lamps without removing the glass chimneys; and it consists in an auxiliary adjusting lighting-wick and tube therefor so combined and arranged that the lighting-wick may be ignited below the base on which the chimney is supported, then be shifted up to the top of the main wick to light it, and then be returned to its normal position below said base of the chimney and be extinguished without hinderance by the chimney, all as hereinafter fully described, reference being made to the accompanying drawings, in which—

Figure 8:
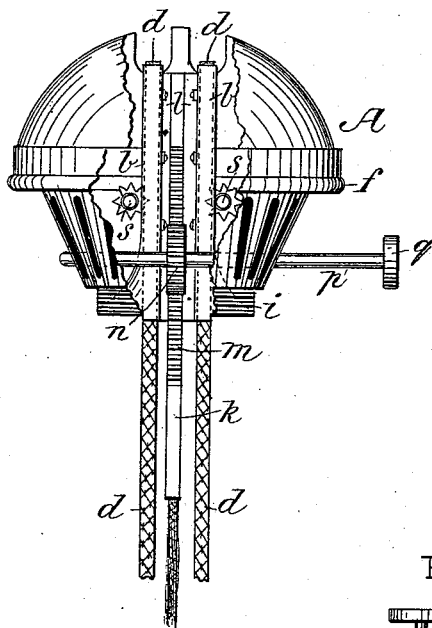
Figure 7:
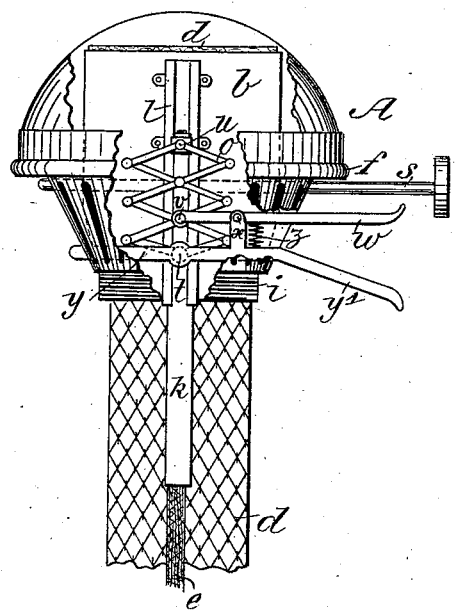
Figure 9:
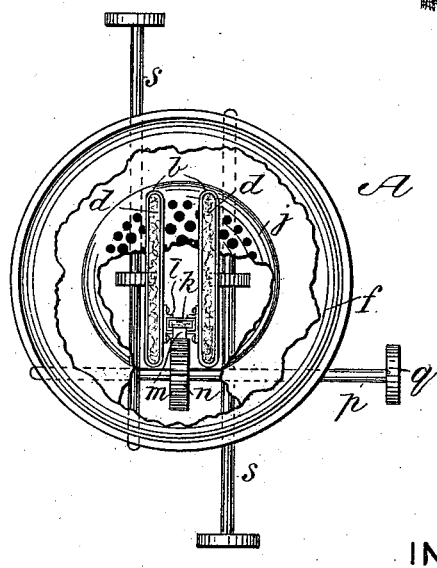

Figures 1 and 2 are side elevations of a lamp-burner partly broken out and provided with my improved lighter arranged in a vertical slideway to be operated by a toothed rack and pinion. Fig. 3 is a top view of the same with some parts of the burner broken out. Fig. 4 is a side elevation, on a larger scale, of part of the auxiliary wick-tube with an extinguisher of the lighting-wick when returned to the normal position. Figs. 5 and 6 are front elevations of part of said auxiliary wick-tube and its slideway, showing the extinguisher in the different positions it assumes when the wick-tube is raised to light the lamp and when it is returned to normal position. These two figures are also drawn to a larger scale than Figs. 1, 2, and 3. Fig. 7 is a side elevation of the burner with part broken out, showing a "lazy-tongs" device for raising and lowering the lighting-wick tube. Fig. 8 is a side elevation of a double-wick burner with a part broken out, showing the application of the lighter to such burners. Fig. 9 is a top view of the burner of Fig. 8, with parts broken out. Figs. 10 and 11 are sectional elevations of a burner with the lighting-wick tube arranged to swing from the position where it is lighted up to the position for igniting the main burner and back again to the normal position. Fig. 12 is a side elevation of a burner with a part broken out, having the lighting-wick tube arranged to both slide and swing in shifting up and down to light the main burner and return to the normal position. Fig. 13 is a plan view of the burner of Fig. 12, also with a part broken out. Fig. 14 is a detail of the device of Figs. 10 and 11 in vertical section on line $y\ y$, Fig. 10, with the igniting-tube turned upright and on an enlarged scale. Fig. 15 is a horizontal section of Fig. 14 on line $z\ z$, and Fig. 16 is a vertical section of the lighting burner-tube of Figs. 12 and 13 on line $w\ w$ and also on an enlarged scale.

A represents a lamp-burner, which may be any ordinary or approved burner having a simple flat-wick tube $b$, as in Figs. 1, 2, 3, 7, 10, and 11, or two such tubes, as in Figs. 8 and 9, or it may be an annular tube $c$, as in Figs. 12 and 13, containing the main-burner wick or wicks $d$. I propose to use an igniting-wick, as $e$, to be normally lodged with its igniting end below the base $f$, supporting the chimney, (not shown,) and where it can be ignited by a match inserted through a hole $g$ of the slotted perforated or other circular and flaring plate $h$, attached to the screw-cap $i$, and supporting said chimney-base $f$ a suitable distance above said screw-cap to admit the air for supporting the flame to the perforated plate $j$, whence it enters the lower end of the chimney and passes up to the flame, said igniting-wick being also provided with suitable means for raising the igniting end up through said perforated plate $j$, and within the base of the chimney to such close proximity to the main-burner wick or wicks $d$ as will readily ignite the same and then return it to the normal position below, where it can be conveniently extinguished, and so that the burner-wick can thus be ignited with much less trouble than by taking off the chimney in the usual way and without risk of breaking the glass chimney either by handling it or by unduly exposing the lower end or part of it to the flame when replacing the chimney over the lighted wick.

I am aware that glass chimneys have been made with a hole in the side for inserting a match so as to reach the burner-wick. Such holes render the chimney more liable to break by expansion and contraction, which will be avoided by my invention. My invention is distinguished from such device in the contrivance of the igniting-wick and the shifting device therefor.

In Figs. 1 to 9, inclusive, I represent a vertically-sliding igniting-wick tube $k$, carrying the igniting-wick $e$, and arranged in a vertical slideway $l$, extending upward from the screwed cap $i$ close by the side of the main wick-tube $b$, said wick-tube $k$ extending through an opening in the screw-cap coincident with the base of the slideway $l$ into the oil-space below a suitable distance for enabling the lower end to reach below said screw-cap when the upper end is raised to the top of the main wick-tube $b$, and thus keep said opening closed. In lamps having only one wick-tube $b$, I prefer to arrange the igniting-wick at the middle of one side of said main wick-tube, as represented in Figs. 1, 2, 3, and 7; but in lamps having two wick-tubes $b$, as in Figs. 8 and 9, I prefer to arrange the said igniting-wick between them and near one edge, as shown in said figures.

The means of raising and lowering the vertically-sliding igniting-wick may be varied at will, as the rack $m$ and pinion $n$, (shown in several of the figures,) or the lazy tongs $o$ in Figs. 7 and 12. The rack is attached to the side of the igniting-wick tube, and the pinion is placed on the shaft $p$, having a milled head $q$ of like character as the milled-headed shafts $s$, employed to raise and lower the main-burner wick. The lazy-tongs has the lower end fulcrumed at $t$, the upper end pivoted at $u$ to the wick-tube $k$, near its upper end, and at $v$ it has the short arm of the lever $w$ pivoted to it, said lever having the fulcrum $x$, which is, together with fulcrum-pivot $t$, preferably supported on a bar $y$, attached or fastened in any approved way to the screwed cap $i$, and having the arm $y'$ projecting beyond the cap below but parallel with the projecting part of lever $w$ for a steady rest for the thumb while pressing down the lever by a finger to extend the tongs. For raising the lighting-wick tube a spring $z$ is suitably arranged with the lever $w$ for retracting the igniting-wick to the normal position. For an extinguisher of the igniting-wick when thus arranged, I provide the cap 2, fixed by the pivot 3 on the slideway, and provided with the spring 4 at such position on said slideway and in such manner that when in the normal position said cap will close over the upper end of the igniting-wick and extinguish it, and when said wick is raised the cap will be forced up by said wick and its tube, as represented in Figs. 5 and 6, to allow them to pass. The side of the slideway $l$ is slotted, as represented at $4^a$, Fig. 4, to allow the cap to be thus operated. The lighting-wick tube is to be raised far enough to raise the extinguishing-cap off the wick before the match is applied.

To bring the end of the igniting-wick to be lighted and extinguished into more convenient access when in the normal position, I have provided the wick-tube $k$ with a laterally-projecting arm 5, in Figs. 12 and 13, and constructed the slideway $l$ with a cam-slot 6, and the wick-tube with a guide-stud $y$, working in said slot in such contrivance that when the wick drops to normal position the free end of arm 5 swings out and rests in or may project slightly through the opening $g$, and when said tube is raised for lighting the lamp said end of the arm swings into the requisite proximity to the wick $d$ for lighting it, and in these figures I have represented the device applied to a round wick-tube $b'$, with which my improved lighter is alike useful in any of its modifications, said arm being curved, as shown in Fig. 13, when the wick-tube is round. The perforated plate has in this instance to be made with a slot 8 to allow the arm to rise up through it, which slot I prefer to make close alongside of the wick-tube. Wherefore I make the inclined part 9 of the cam-slot so as to swing the arm to the range of said slot 8 when reaching the height of said plate $j$. For the rest of the travel of the arm the straight part of the cam-slot causes it to work close along the wick-tube $b'$. This arrangement is also favorable to the application of the swinging arm to burners having round wicks, in which the space between the burner and the base of the lamp-chimney is so limited as to require such close arrangement of the slot for the said arm with the wick-tube. In this arrangement of the wick-tube $b$ with the laterally-projecting arm it is found desirable to provide the slots 10 at intervals along the arm and upper part of the tube to facilitate inserting and adjusting the wick with a pointed instrument, as a needle. It will be seen that with the arrangement of the lighting-wick tube thus projecting to or beyond the lighting-opening $g$ the end is not only in more convenient reach for lighting and extinguishing, but an extinguisher 2 may be arranged with it there as well, and so as to gravitate against the end of the wick, if preferred. In this arrangement the lazy-tongs $o$ are employed to shift the wick-tube up and down, the connection being made above the top of the guideway-tube $l$ by the internally-grooved collar 11, to which the pivot $u$ is attached, and in which the tube is swiveled by the collar 12, allowing the tube to turn while being raised or lowered thereby. The fulcrum $u$ of the lazy-tongs is in this case attached to the guide-tube $l$.

For another means of raising and lowering the igniting-wick, and also for presenting the end at the opening $g$ for greater convenience in lighting and extinguishing it, I provide a jointed wick-tube, as in Figs. 10, 11, 14, and 15, in which the lower part $k'$ is fixedly applied to the tube $b$ and screw-cap $i$, and the part $k^2$ swings on the joint at 13, Figs. 10 and 11, to raise and lower the lighting end, the joint being so constructed that the wick $e$ may extend through it freely, and said part $k^2$ working through a slot of the plate $j$, like the arm 5, as will be understood by looking at Fig. 10, where it will be seen that when said part $k^2$ is down in the normal position it rests in and closes the slot. The upper end of the part $k'$ of this jointed tube has the enlarged head 14, and the part $k^2$ has the corresponding, but a little smaller, enlarged base-section 15, partly inclosed in the head 14 and at one side attached to the head 16 of the shaft $p$, employed for raising and lowering the lighting-wick, said head of the shaft extending through one side of and into said head 14 of the part $k'$ far enough to so connect with the side of the base of the part $k^2$.

I claim—

1. The combination, with a lamp-burner having an opening through the side below the chimney-supporting base for inserting a match, of an adjustable igniting-wick and wick-tube normally lodged with the igniting end of said wick in reach of a match inserted through said opening, and a lifter below the chimney-supporting base, and a lifter and depressor adapted to shift said end to and from the lamp-wick while inclosed by the lamp-chimney, substantially as described.

2. The combination, with a lamp-burner having an opening through the side below the chimney-supporting base for inserting a match, of an adjustable igniting-wick and wick-tube normally lodged with the igniting end of said wick in reach of a match inserted through said opening, a lifter and depressor below the chimney-supporting base, a lifter and depressor adapted to shift said end to and from the lamp-wick while inclosed by the lamp-chimney, and an extinguisher closing on said end of the lighting-wick when it returns to the normal position, substantially as described.

3. The combination, with a lamp-burner having an opening through the side below the chimney-supporting base for inserting a match, of an adjustable igniting-wick and wick-tube normally lodged with the igniting end of said wick at the mouth of said opening through the side of the chimney-supporting base and below said base, and a lifter and depressor adapted to shift said end to and from the lamp-wick while inclosed by the lamp-chimney, substantially as described.

4. The combination, with a lamp-burner having an opening through the side below the chimney-supporting base for inserting a match, of an adjustable igniting-wick and wick-tube normally lodged with its igniting end at the mouth of said opening, a lifter and depressor adapted to shift said end to and from the lamp while inclosed by the lamp-chimney, and a gravitating extinguisher suspended in proximity to the normal position of said igniting end to extinguish the lighting-flame when said wick is returned to said position, substantially as described.

5. The combination, with a lamp-burner having an opening through the side below the chimney-supporting base for inserting a match, of the ignitible wick, the jointed tube therefor normally lodged with the igniting end at the mouth of said opening, and the lifter and depressor adapted to shift the end of said igniting-wick to and from the lamp-wick while inclosed in the chimney, substantially as described.

6. The combination, with the lamp-burner having an opening through the side below the chimney-supporting base for inserting a match, of the igniting-wick, the jointed tube therefor normally lodged with the end of the wick at the mouth of said opening, and the lifter and depressor consisting of the shaft entering the head of the stationary part of said jointed wick-tube and attached to the base of the shifting part thereof and adapted to shift the end of said igniting-wick to and from the lamp-wick while inclosed in the chimney, substantially as described.

In testimony that I claim the foregoing as my invention I have signed my name, in presence of two witnesses, this 26th day of April, 1890.

JOHAN WITZELL.

Witnesses:
W. J. MORGAN,
A. P. THAYER.

Correction in Letters Patent No. 447,393.

It is hereby certified that in Letters Patent No. 447,393, granted March 3, 1891, upon the application of Johan Witzell, of New York, N. Y., for an improvement in "Lamp-Lighters," an error appears in the printed specification requiring correction as follows: In lines 21-2, page 3, the words "and a lifter below the chimney-supporting base" should be stricken out; and that the said Letters Patent should be read with this correction therein to make the same conform to the record of the case in the Patent Office.

Signed, countersigned, and sealed this 17th day of March, A. D. 1891.

[SEAL.]

CYRUS BUSSEY,
*Assistant Secretary of the Interior.*

Countersigned:

C. E. MITCHELL,
*Commissioner of Patents.*